United States Patent [19]

Ishikawa et al.

[11] Patent Number: 5,597,398
[45] Date of Patent: Jan. 28, 1997

[54] PROCESS FOR PRODUCING GLASS PREFORM FOR OPTICAL FIBER

[75] Inventors: Shinji Ishikawa; Yoshiki Chigusa; Motonori Nakamura; Yoshinori Makio; Morio Watanabe, all of Yokohama, Japan

[73] Assignee: Sumitomo Electric Industries, Ltd., Osaka, Japan

[21] Appl. No.: 260,747

[22] Filed: Jun. 15, 1994

[30] Foreign Application Priority Data

Jun. 16, 1993 [JP] Japan .................................. 5-144746

[51] Int. Cl.$^6$ .................................................. C03B 37/018
[52] U.S. Cl. .................................. 65/413; 65/421; 65/503
[58] Field of Search ............................... 65/413, 414, 421, 65/424, 426, 494, 503

[56] References Cited

U.S. PATENT DOCUMENTS

| | | |
|---|---|---|
| 3,775,075 | 11/1973 | Keck et al. . |
| 4,302,230 | 11/1981 | MacChesney et al. ............ 65/414 |
| 4,793,842 | 12/1988 | Yokota et al. . |
| 5,112,219 | 5/1992 | Hiemstra . |

FOREIGN PATENT DOCUMENTS

| | | |
|---|---|---|
| 0367871 | 5/1990 | European Pat. Off. . |
| 61-186240 | 8/1986 | Japan . |
| 62-162646 | 7/1987 | Japan . |
| 4-292432 | 10/1992 | Japan .................................. 65/421 |

OTHER PUBLICATIONS

Kyoto et al., "Characterization of Fluorine–Doped Silica Glasses," Journal of Materials Science 28 (1993), pp. 2738–2744.
Patent Abstracts of Japan, vol. 14, No. 562 (C–788) Dec. 13, 1990 & JP–A–02 243 531 (Fujikura Ltd.) Sep. 27, 1990.
Patent Abstracts of Japan, vol. 11, No. 141 (C–421) May 8, 1987 & JP–A–61 281 037 (Sumitomo Electric Industries Ltd.) Dec. 11, 1986.
Patent Abstracts of Japan, vol. 12, No. 306 (C–522) Aug. 19, 1988 & JP–A–63 079 731 (Sumitomo Electric Industries Ltd.) Apr. 9, 1988.
Patent Abstracts of Japan, vol. 13, No. 119 (C–579) Mar. 23, 1989 & JP–A–63 291 832 (Fujikura Ltd.) Nov. 1988.
Patent Abstracts of Japan, vol. 9, No. 192 (C–296) Aug. 8, 1985 & JP–A–60 060 935 (Furukawa Electric Co. Ltd.) Apr. 8, 1985.
Patent Abstracts of Japan, vol. 7, No. 3 (C–143) Jan. 7, 1983 & JP–A–57 160 927 (NTT Corp.) & Chemical Abstracts, vol. 98, No. 16, Apr. 18, 1983, abstract No. 131155a.
Patent Abstracts of Japan, vol. 10, No. 63 (C–332) Mar. 13, 1986 & JP–A–60 200 835 (Sumitomo Electric Industries Ltd.) Mar. 24, 1989.
Patent Abstracts of Japan, vol. 16, No. 40 (C–906) Jan. 31, 1992 & JP–A–03 247 532 (Furukawa Electric Co. Ltd.) Nov. 5, 1991.
Patent Abstracts of Japan, vol. 13, No. 283 (C–612) Jun. 28, 1989 & JP–A–01 079 034 (Sumitomo Electric Industries Ltd.) Mar. 24, 1989.
Patent Abstracts of Japan, vol. 12, No. 462 (C–549) Dec. 5, 1988 & JP–A–63 182 232 (Hitachi Cable Ltd.) Jul. 27, 1988.
Patent Abstracts of Japan, vol. 11, No. 398 (C–466) Dec. 25, 1987 & JP–A–62 158 130 (Hitachi Cable Ltd.) Jul. 14, 1987.
Patent Abstracts of Japan, vol. 14, No. 146 (C–704) Mar. 20, 1990 & JP–A–02 018 334 (Fujikura Ltd.) Jan. 22, 1990.

(List continued on next page.)

Primary Examiner—David A. Simmons
Assistant Examiner—M. Curtis Mayes
Attorney, Agent, or Firm—Cushman Darby & Cushman IP Group of Pillsbury Madison & Sutro LLP

[57] ABSTRACT

A process for producing a porous glass preform for optical fiber by depositing fine glass particles on an outer surface of a glass material while moving the glass material, including the steps of: preheating a portion of the glass material for not less than 5 minutes to clean the portion of the glass material in an apparatus for depositing fine glass particles; and depositing fine glass particles on the portion of the glass material cleaned by the preheating, in the apparatus for depositing fine glass particles.

16 Claims, 4 Drawing Sheets

OTHER PUBLICATIONS

Patent Abstracts of Japan, vol. 12, No. 191 (C–501) Jun. 3 1988 & JP–A–62 297 239 (Sumitomo Electric Industries Ltd.) Dec. 24, 1987.

Patent Abstracts of Japan, vol. 8, No. 7 (C–204) Jan. 12, 1984 & JP–A–58 176 138 (NTT Corp.) Oct. 15, 1983.

Patent Asbstracts of Japan, vol. 13, No. 283 (C–612) Jun. 28, 1989 & JP–A–01 079 033 (Sumitomo Electric Industries Ltd.) Mar. 24, 1989.

Patent Abstracts of Japan, vol. 10, No. 139 (C–348) May 22, 1986 & JP–A–60 264 338 (Furukawa Electric Co. Ltd.) Dec. 27, 1985.

Patent Abstracts of Japan, vol. 13, No. 575 (C–667) Dec. 19, 1989 & JP–A–01 239 034 (Fujikura Ltd.) Sep. 25, 1989.

Patent Abstracts of Japan, vol. 12, No. 378 (C–534) Oct. 6, 1988 & JP–A–63 123 830 (Fujikura Ltd.) May 27, 1988.

SiCl₄ etc.
H₂, O₂

EXHAUST

PROCESS FOR PRODUCING GLASS PREFORM FOR OPTICAL FIBER

BACKGROUND OF THE INVENTION

1. Field of the Invention

The present invention relates to a process for forming an aggregate or agglomerate of fine glass particles on an outer surface of a starting material (e.g., on the circumference of a cylindrical starting material). More particularly, the present invention relates to a process for producing a glass preform for optical fiber, which comprises a glass material and deposit of fine glass particles formed on the circumference thereof. Such a glass preform may suitably be used as an intermediate product particularly in the fabrication of an optical fiber glass preform which is required to have high purity.

2. Related Background Art

Heretofore, the so-called "outside vapor-phase deposition process" as disclosed in Japanese Laid-Open Patent Application (KOKAI) No. 73522/1973 (i.e., Sho 48-73522), is known as a process for producing a silica glass (or fused silica) tube or preform for optical fiber. In this process, a glass tube is produced in the following manner.

Thus, fine particles of glass such as $SiO_2$, which may be formed by hydrolysis of a raw material such as $SiCl_4$, are caused to be deposited on the circumference of carbon or a refractory or fire-resistant starting material such as silica glass or alumina rotating about its horizontal axis as the rotational axis. The deposition of the glass is stopped after a predetermined amount of the glass particles are deposited, and the starting material is pulled out to provide a tubular glass aggregate. This tubular glass aggregate is sintered for transparency-imparting vitrification under a high temperature atmosphere in an electric furnace so as to provide a transparent tubular glass.

Alternatively, a glass tube or preform may also be formed in the following manner.

In such a process, a solid optical fiber preform (i.e., a preform having the inside completely filled up) may be used as a starting material in a similar manner as described above to provide a complex of the starting material and deposit of fine glass particles formed on the circumference of the starting material. Then, the complex is subjected, without pulling out the above-mentioned starting material, to heat treatment in a high temperature furnace so as to sinter the portion of the deposit of fine glass particles, whereby a transparent glass layer is further formed on the circumference of the optical fiber glass preform as the starting material.

In addition, Japanese Laid-Open Patent Application No. 186240/1986 (i.e., Sho 61-186240) discloses another process. In this process, as shown in FIG. 3, a glass raw material is supplied into flame 3 fed from a burner 2 for synthesizing fine glass particles to produce fine glass particles. The thus produced fine glass particles start to be deposited on the circumference of a substantially cylindrical or cylindrical tubular starting material 1 rotating about its axis (in a vertical direction) as a rotational axis 7, from the neighborhood of one end of the starting material 1. Then, the burner 2 is relatively moved in parallel with the axis of the starting material 1 so that deposit 6 of fine glass particles is formed around the circumference of starting material 1 with respect to the axis direction. Thereafter, the thus obtained deposit of fine glass particles is heated at a high temperature for vitrification to provide a transparent product. In FIG. 3, reference numeral 8 denotes a reaction vessel (soot deposition furnace) and reference numeral 9 denotes an exhaust port.

In the conventional processes as described above, however, there could occur a case such that foreign matter such as dust is attached to the starting glass material in the above-mentioned deposition process, and the attached foreign matter would cause a defect in the transparent vitrified glass product. Examples of such a defect may include a crystal and/or a bubble. In either case, a portion where the defect is caused cannot be used as a good glass product.

As a solution to the above problem, there is known a method wherein fine glass particles are deposited on a glass rod while the glass rod is purged with a clean gas, as disclosed in Japanese Laid-Open Patent Application No. 162646/1987 (i.e., Sho 62-162646). This method is effective to a certain extent. However, according to the present inventors' investigation, it has been found that the foreign matter such as dust could not be removed completely, when the glass rod is simply placed in a clean gas.

SUMMARY OF THE INVENTION

An object of the present invention is to provide a process for producing a glass preform for optical fiber which is capable of reducing the occurrence of a defect in the resultant glass preform.

According to the present invention, there is provided a process for producing a porous glass preform for optical fiber by depositing fine glass particles on an outer surface of a glass material while moving the glass material, comprising:

preheating a portion of the glass material for not less than 5 minutes to clean the portion of the glass material in an apparatus for depositing fine glass particles; and depositing fine glass particles on the portion of the glass material cleaned by the preheating, in the apparatus for depositing fine glass particles.

In the present invention, when the glass material is preheated in a gas containing water vapor in a reaction vessel, the preheating may preferably be effected by using oxyhydrogen flame fed from a preheating burner disposed below the fine glass particle-synthesizing burner, or by using an electric heating device disposed outside of the reaction vessel and below the fine glass particle-synthesizing burner while supplying a gas containing water vapor to the surface of the glass material.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

DETAILED DESCRIPTION OF THE INVENTION

Figure 1:
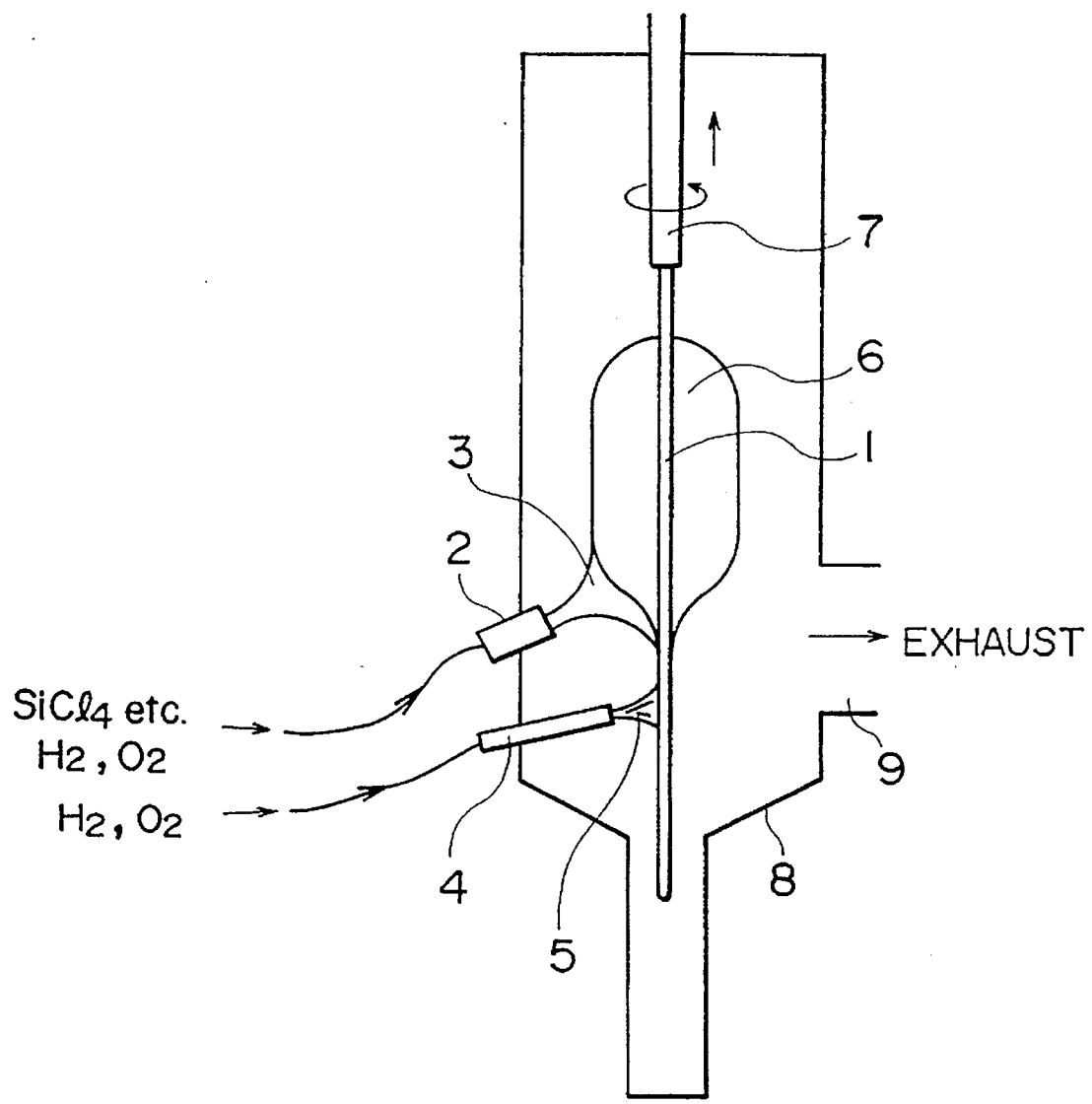
FIG. 1 is a schematic sectional view for illustrating an embodiment of the present invention, which shows the structure of an apparatus comprising a burner for preheating (preheating burner) disposed below a burner for synthesizing fine glass particles.

As a result of earnest study by the present inventors on the occurrence of a bubble and/or crystal at the boundary between a starting material and a glass product formed on the circumference of the starting material in a transparent vitrified glass product, it has been found that the bubble and/or crystal is based on, as one of the causes therefor, contamination on the circumference of a starting material before the step of depositing fine glass particles on the circumference thereof, and that such contamination cannot be removed sufficiently only by the conventional cleaning means as described above.

According to the present inventors' investigation, examples of the above contaminant may include: carbon, organic substance such as fiber, inorganic substance such as metal (inclusive of Fe, Na, K, Ca, etc.), and glass particles per se inclusive of quartz ($SiO_2$), etc. If a metal is attached to the starting material, it can provide a nucleus or seed for crystallization and a crystal is liable to be formed during the transparency-imparting vitrification. On the other hand, if an organic substance or glass particle is attached to the starting material, it can invite irregularity (or mismatching) during the deposition of fine glass particles, and the irregularity is liable to provide a bubble during the vitrification.

Among these contaminants, the metals and glass particles may be present in the environment for the fabrication of a preform. Accordingly, the attachment of such contaminants can be prevented by tracking down the source of the contaminants. However, the organic substance can originate from clothes of operators, etc., and it is more difficult to prevent the attachment of such organic substance.

The present inventors have tried to eliminate a cause for the defect by sufficiently removing the contamination component attached to a starting material. As a result of the present inventors' study, it has been found that the contamination component attached to a starting material may sufficiently be removed by heating a surface of the starting material in an apparatus wherein fine glass particles are to be deposited on the surface of the starting material, before the fine glass particles are deposited on the surface thereof. As a result of further study by the present inventors, it has further been found that the contamination component attached to the starting material may more effectively be removed by heating the surface of the starting material in a reaction vessel for depositing fine glass particles, immediately before the fine glass particles are deposited on the surface of the starting material by use of a burner for synthesizing fine glass particles. Based on such a discovery, the present inventors have completed the present invention.

In the present invention, the heating may desirably be conducted at a temperature of not lower than 1000° C. and lower than 1600° C. If the temperature is lower than 1000° C., the efficiency of the surface cleaning is not so good. On the other hand, if the temperature is not lower than 1600° C., there may be posed a problem of deformation on the basis of a decrease in the viscosity of glass. Experiments were further conducted in detail and the results obtained thereby are shown hereinbelow.

Experiment Example

In order to examine the effect of removal of foreign matter such as dust by heating, the following experiments were conducted.

First, dust in the manufacturing environment was sampled and dispersed in pure water at a concentration of 1 g/l. The thus obtained dispersion was attached to a cleaned glass rod. The glass rod used herein was one made of synthetic silica glass having an outer diameter of 13 mm.

The rod was placed in a deposition apparatus shown in FIG. 1 and soot (of fine glass particles) was deposited on the circumference of the rod 1 through a burner 2 for synthesizing soot (i.e., burner for synthesizing fine glass particles). In FIG. 1, reference numeral 1 denotes a glass material (starting material); numeral 2, the burner for synthesizing fine glass particles; numeral 3, flame; numeral 4, a burner for preheating; numeral 5, oxyhydrogen flame; numeral 6, deposit of fine glass particles; numeral 7, a rotation axis; numeral 8, a reaction vessel (soot deposition furnace); and numeral 9, exhaust port.

In this experiment, the heating temperature was adjusted by changing the $H_2/O_2$ ratio in the preheating burner (or auxiliary burner) 4.

The soot (deposit of fine glass particle deposit) thus obtained was subjected to heat treatment at a heater temperature of 1670° C. under ambient of He (flow rate: 10 l/min) in a reaction tube of quartz glass (silica glass) to be converted into a transparent glass product.

Further, it was considered that the glass rod could be elongated by the heating. Accordingly, the lengths of the glass rod before and after the soot deposition were measured to obtain a change in the length as elongation.

The elongation was obtained from the following equation:

Elongation=[{(total length after soot deposition) −(total length before soot deposition)}/(total length before soot deposition)]× 100(%).

In this experiment, the temperature of a portion heated by the preheating burner 4 was measured by means of an infrared radiation thermometer (trade name: Thermo Tracer TH-1102, mfd. by NEC San-ei Instrument Ltd.). The number of defect was obtained from the number of observed light-scattering point when white light emitting from a halogen lamp (100 W) was incident to an end of the resultant glass preform.

The results thus obtained are shown in the following table.

TABLE

| <No.> | <Temp. (°C.)> | <Defect (number/cm)> | <Elongation (%)> |
|---|---|---|---|
| 1 | 0.000 | 50.000 | 0.000 |
| 2 | 1000.000 | 10.000 | 0.000 |
| 3 | 1100.000 | 7.000 | 0.000 |
| 4 | 1200.000 | 2.000 | 0.000 |
| 5 | 1300.000 | 0.500 | 0.000 |
| 6 | 1400.000 | 0.200 | 0.200 |
| 7 | 1500.000 | 0.100 | 0.400 |
| 8 | 1600.000 | 0.050 | 0.900 |
| 9 | 1670.000 | 0.020 | 2.500 |
| 10 | 1700.000 | — | melt |

Figure 5:
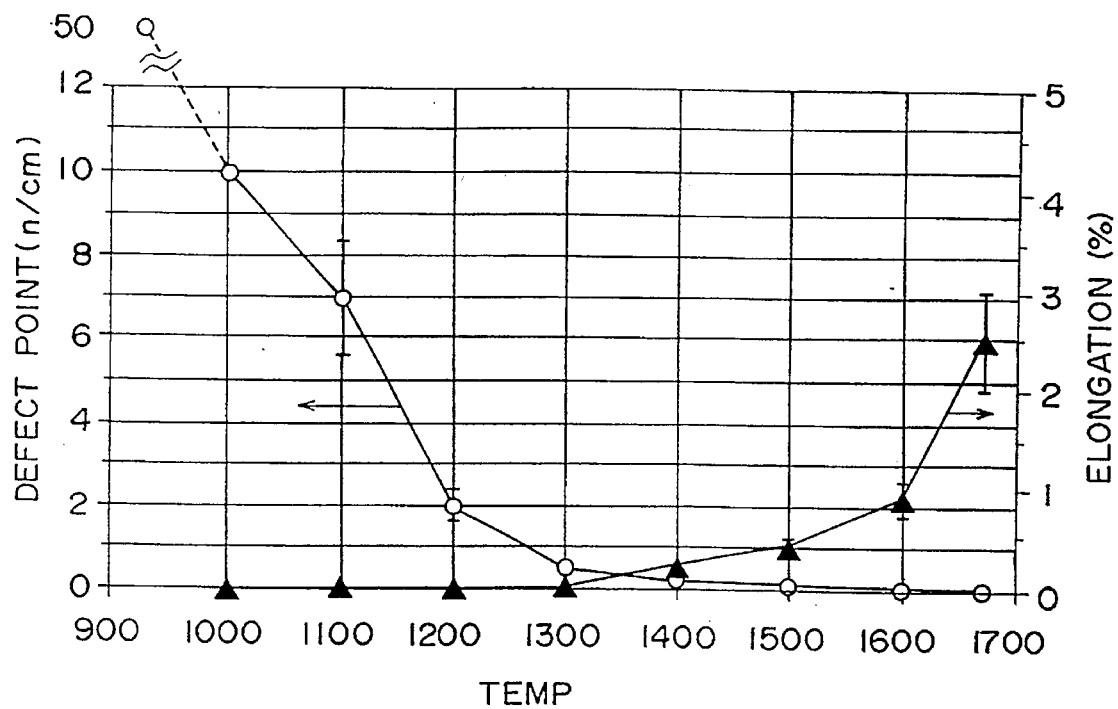
FIG. 5 is a graph showing a relationship among temperature, density of defects and elongation in Experiment Example appearing hereinbelow.

As shown in the above table, in a case where heat treatment was not conducted by using the auxiliary burner 4, 50 defects/cm (bubbles and/or crystals) were observed. When the temperature of the heat treatment was increased, the number of defects was remarkably reduced. As shown in FIG. 5, the defect points are represented by circles, while the elongation points are represented by darkened triangles. For instance, the circle to the far left represents the defect under the condition of no temperature treatment.

However, the elongation due to the weight of the glass rod per se began to be observed at a temperature of higher than 1500° C., and the glass was melted at 1700° C. If a considerable elongation of the glass preform occurs, the design profile (or intended profile) would be changed when the glass preform is drawn into an optical fiber. Accordingly, such an elongation is not preferred. However, an elongation of 0.2% or less is generally within a tolerance of design, while the degree of the tolerance also depends upon an intended structure of the glass preform or optical fiber.

As shown in the above Experiment Example, the effect of cleaning can be recognized even under heat treatment at 1000° C., and the effect is a decrease in the number of defects to 20% as compared with that in the untreated case (the number of defects=50). A more desirable temperature range is not lower than 1200° C. On the other hand, if the temperature of the heat treatment is 1400° C. or higher, a considerable elongation of the starting glass material can occur. Accordingly, the temperature of the heat treatment may preferably be lower than 1400° C.

In view of deformation of glass, it is considered that a change in the composition of a starting glass material can provide a change in the glass viscosity thereof even at the same temperature, and the degree of the deformation can also change even at the same temperature.

For example, a glass rod doped with fluorine (or a rod of a fluorine-containing glass) shows a viscosity corresponding to about one tenth of the viscosity of silica glass at a relative refractive index difference of 0.5%, as described in J. Material Science, 28 (1993), 2738–2744. As a standard for glass deformation, a softening point is defined by ASTM (American Society for Testing Materials), which is a temperature at which the viscosity of a material to be tested becomes about $4 \times 10^7$ poises. At a temperature higher than the softening point, glass begins to be rapidly fluidized or fluidified. From the viewpoint of safety, it is desired that the heat treatment is conducted at a temperature of not higher than the temperature at which the viscosity of glass is at least ten times higher than the viscosity thereof at the softening point (i.e., at a temperature of not higher than the temperature at which the viscosity of the glass is at least $5 \times 10^8$ poise). The above-mentioned softening point according to ASTM is a temperature at which an upper portion (length= 10 cm) of a sample having a diameter of 0.55–0.75 mm and a length of 23.5 cm and being uniform in thickness shows an elongation of 1 ram/min., when the sample is heated at a temperature increasing rate of 5° C./min. In the case of a glass having a density of 2.5 g/cm$^3$, the softening point is a temperature at which the glass shows a viscosity of $10^{7.6}$ poise.

More specifically, in the present invention, the maximum temperature of the preheated portion of the glass material (starting material) measured by the above-mentioned infrared radiation thermometer may preferably be not lower than 1000° C. and lower than 1600° C., more preferably not lower than 1200° C. and lower than 1400° C., in view of the efficiency of the cleaning and prevention of the elongation of the glass preform.

In an embodiment wherein a glass material (such as fluoride glass material) having a relatively low melting or softening point, the maximum temperature of the preheated portion of the glass material may preferably be a temperature at which the glass material shows a viscosity of not less than $5 \times 10^8$ poise, more preferably $1 \times 10^{10}$ poise. Such a viscosity may for example be measured by the penetration method.

In other words, the maximum temperature of the preheated portion of the glass material may preferably be a temperature which is lower than the softening point of the glass material by about 80°–120° C. (particularly preferably, by about 100° C.).

The heat treatment should preferably be conducted for a period of time until the attached dust component is reacted and removed substantially perfectly. The reaction for the removal of the dust may vary depending on the kind of the dust attached to the starting material. For example, when there is considered a case wherein a protective layer is formed on the surface by the reaction, a treatment for approximately 370 seconds at 1100 ° C. is preferred in order to remove 90% of particles of 1 μm. When the temperature for the treatment is raised, the treatment efficiency is improved. If the treatment is conducted at 1200° C. for the same period of time, substantially 100% of dust can be removed.

In the present invention, the period of time for the preheating may preferably be not less than 5 min., more preferably not less than 10 min. On the other hand, the period of time for the preheating may preferably be not more than 50 min. In the present invention, the preheating may preferably be conducted at a temperature of not lower than 1100° C. for a period of time of not less than 5 min, more preferably at a temperature of not lower than 1200° C. for a period of time of not less than 5 min.

In the present invention, the period of time between the preheating and the heating for the synthesis of glass fine particles, or the distance between the preheating means (such as preheating burner 4) and the glass fine particle-synthesizing burner 2 may very depending on the temperature of the preheating and/or the heating for glass fine particle synthesis, the moving speed of the starting material, etc. In the present invention, in general, the period of time between the preheating and the heating for glass fine particle synthesis, or the distance between the preheating means and the glass fine particle-synthesizing burner 2 may preferably be such that the minimum temperature (measured by the above-mentioned infrared radiation thermometer) within the portion of the glass material located between the preheating means and the particle-synthesizing burner 2 (e.g., the temperature at the middle point of such a portion) is about 500° C. or higher, more preferably about 500°–900° C. (particularly preferably, about 600°–800° C.).

In the present invention, with respect to the number of the defects, when a portion of the resultant preform (length: 50 cm) is subjected to the light-scattering point measurement using the above-mentioned halogen lamp, it is preferred that a defect (bubble or crystal) having a diameter exceeding 1 mm is not observed in the length of 50 cm, and the number of the defects having a diameter of 1 mm or less (e.g., a diameter of about 0.5–1 mm) may preferably be 5 cm or less, more preferably 4 or less (particularly preferably 3 or less). The presence and/or diameter of the defect in the preform may for example be determined by placing the preform to be examined on a section paper and determining the presence or diameter of the defect on the basis of observation with naked eye. In this case, the preform per se may function as a magnifying glass.

In the present invention, it is preferred that the preheating atmosphere contains water vapor or steam. The reason for this is as follows.

Thus, when an oxygen or oxidative atmosphere is employed for the purpose of oxidizing a carbon-type or carbon-containing component, the reaction is liable to be strongly exothermic, and the resultant heat can cause a nucleus or seed for crystallization. On the other hand, when the preheating is conducted in an atmosphere containing water vapor, the heat of reaction due to the oxidation of carbon may be reduced or compensated on the basis of an endothermic reaction between the water vapor and carbon, as shown in the following table.

TABLE

Oxidation Initiation Temp. and Relative Oxidation Rate

| <Reaction> | <Relative Rate> | <Oxidation Initiation Temp.> |
|---|---|---|
| $C-O_2$ | $1 \times 10^5$ | 400° C. |
| $C-H_2O$ | 3 | 700° C. |
| $C-CO_2$ | 1 | 900° C. |
| $C-H_2$ | $3 \times 10^{-3}$ | — |

The water vapor-containing gas or preheating atmosphere may preferably contain water vapor in an amount of not less than 1% by volume, more preferably not less than 2% by volume. If the water vapor content is less than 1% by volume, the effect of treatment with water vapor is not sufficient.

Specific examples of the means for preheating in the water vapor-containing atmosphere may include a preheating burner 4 as shown in FIG. 1. In FIG. 1, a surface of a glass material (starting material) 1 is treated with water vapor under heating on the basis of the reaction of:

$$2H_2+O_2 \rightarrow 2H_2O$$

in oxyhydrogen flame 5 of a steam heating burner (preheating burner) 4 disposed below a burner 2 for synthesizing fine glass particles. In other words, the preheating burner 4 is disposed upstream of the fine glass particle-synthesizing burner 2 with respect to the moving direction of a glass starting material 1.

In this embodiment, the quantitative ratio of $H_2$ to $O_2$ (i.e., ratio of $H_2/O_2$) in the oxyhydrogen flame 5 may preferably be 2 or larger (more preferably 2.5 or larger) in order to avoid excess of $O_2$. On the other hand, the quantitative ratio of $H_2$ to $O_2$ in the fine glass particle-synthesizing burner 2 (i.e., $H_2/O_2$) is usually less than 2.0. For example, $H_2:O_2=$ 30:45 in Example 1 appearing hereinbelow.

Figure 4:
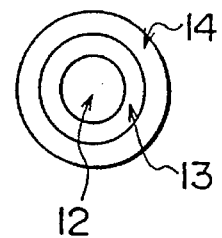
FIG. 4 is a schematic cross-sectional view showing the structure of a preheating burner to be usable in the present invention.
Figure 6:
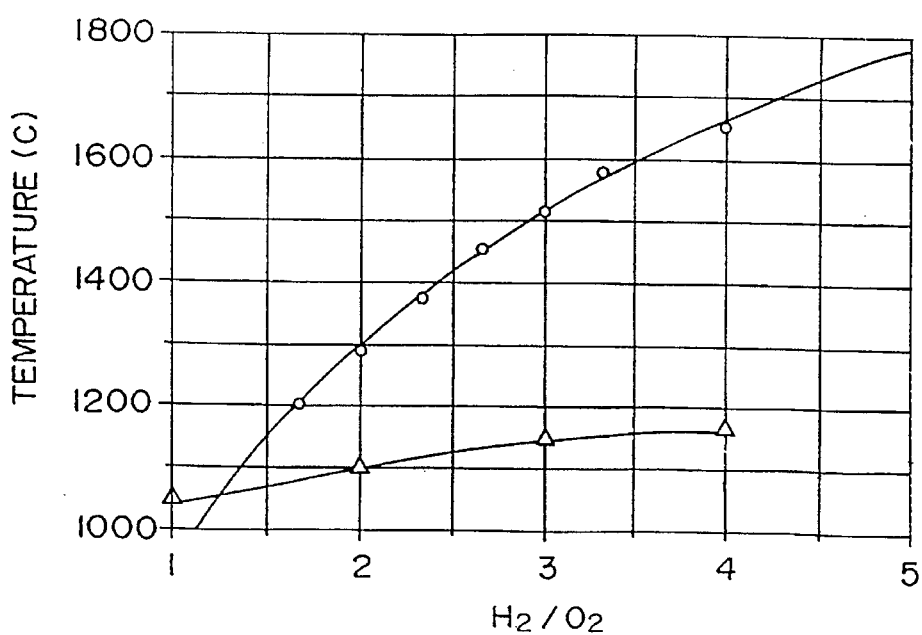
FIG. 6 is a graph showing a relationship between $H_2/O_2$ ratio and temperature of a glass rod in Experiment Example appearing hereinbelow.

In order to form the oxyhydrogen ($H_2/O_2$) flame 5, it is preferred to use a preheating burner 4 comprising a plurality of ports 12, 13 and 14 concentrically arranged as shown in a schematic cross-sectional view of FIG. 4. When such a burner having a concentric structure is used, it is preferred to supply $H_2$, $O_2$ and an inert gas to the respective ports arranged concentrically in the burner. According to the present inventors' experiment, it has been confirmed that the heating temperature can be elevated by supplying $O_2$ to the central port 12 in FIG. 4. FIG. 6 is a graph showing a temperature characteristic of a glass rod (i.e., a relationship between $H_2/O_2$ ratio and temperature of the heated glass rod) in a case where $H_2$ or $O_2$ is caused to flow through the central port 12 of the same burner. As shown in the graph of FIG. 6, a high temperature of 1200° C. or higher can be realized in a case where $O_2$ is caused to flow through the central port 12. In FIG. 6, the measured values for the flow of $O_2$ through the central port 12 are represented by the circles, whereas the measured values for the flow of $H_2$ through the central port 12 are represented by the triangles. Further, the glass rod had a diameter of 13 mm, and the flow of $O_2$ was 1.5 slm.

Further, when an inert gas such as Ar is caused to flow through a port 13 disposed between the port for supplying $H_2$ and the port for supplying $O_2$, burning or seizing at the tip of the burner can be prevented. The reason for this may be that the flow of the inert gas can prevent the formation of flame in the burner.

Figure 2:
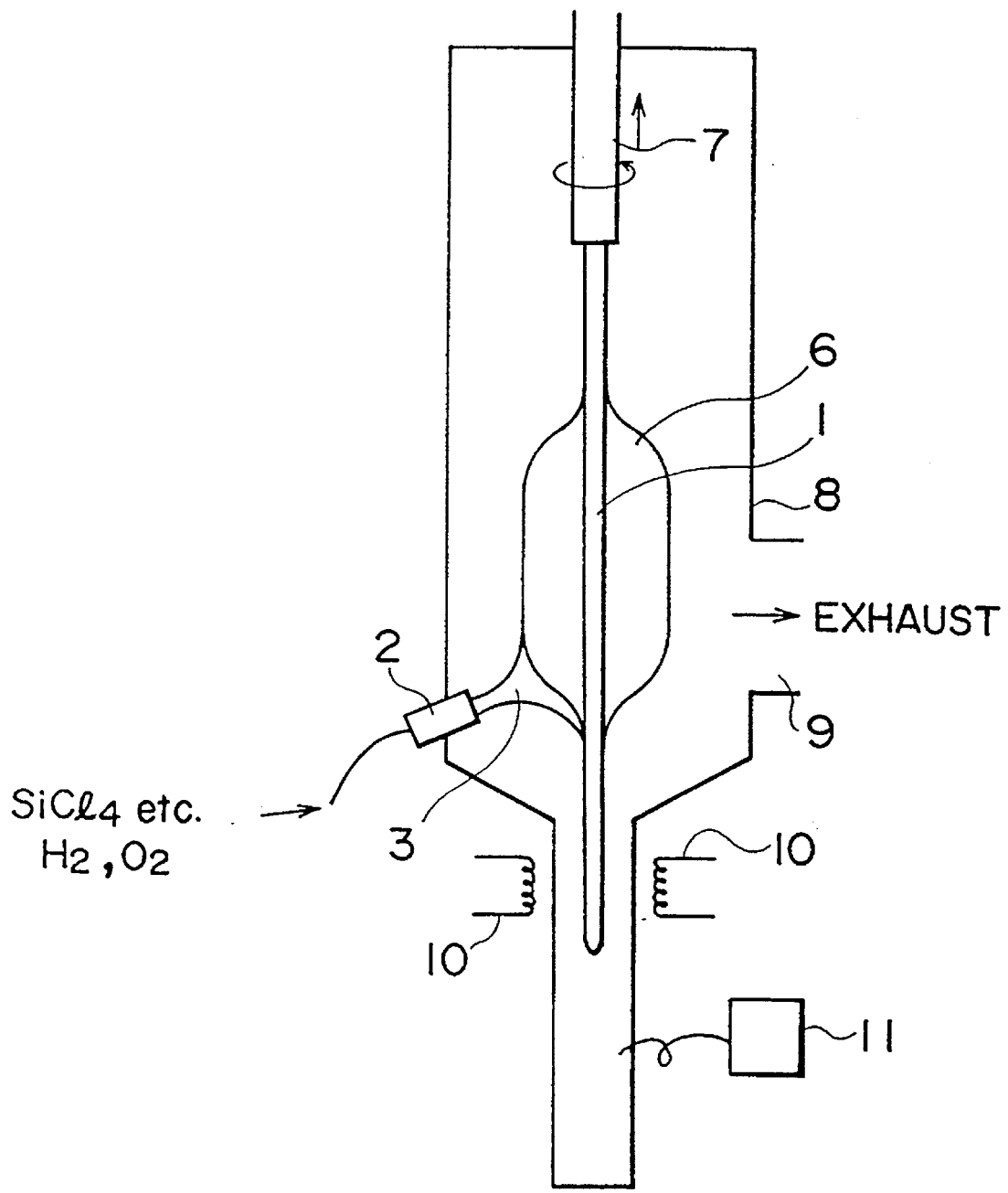
FIG. 2 is a schematic sectional view for illustrating another embodiment of the present invention, which shows the structure of an apparatus wherein cleaning is conducted by heating with an external heater while a water vapor-containing gas is introduced into a lower portion of a reaction vessel (soot deposition furnace).

FIG. 2 shows another embodiment of apparatus for soot deposition. The apparatus shown in FIG. 2 has substantially the same structure as that of the apparatus shown in FIG. 1, except that a heater 10 such as electric heater is disposed as preheating means in place of the preheating burner 4 in FIG. 1. In the present invention, the preheating may also be conducted by electric resistance heating by use of a heater 10 provided outside a reaction vessel (soot deposition furnace) 8 as shown in FIG. 2. In this case, when water vapor is contained in the preheating atmosphere, it is preferred to supply a water vapor-containing gas from a water vapor-supplying device 11 to the reaction vessel 8. The device 11 for supplying water vapor-containing gas may preferably be disposed upstream of the preheating means (electric heater) 10, and upstream of the burner 2 for synthesizing fine glass particles, with respect to the moving direction of the glass material.

In the present invention, the preheating may also be conducted by using another heating means such as high-frequency heating and laser (e.g., $CO_2$-laser).

In the present invention, a starting material is cleaned by heating in an apparatus for glass fine particle synthesis (e.g., by use of oxyhydrogen flame immediately before the starting material is subjected to the deposition of fine glass particles). According to the present inventors' investigation, it has been confirmed that such a cleaning treatment does not substantially affect the transmission loss of an optical fiber to be finally produced from the resultant glass preform. More specifically, when optical fibers were produced by the conventional process for simple deposition of fine glass particles (without preheating of a starting material), the resultant optical fibers showed a transmission loss of 0.350 dB/km (average for fiber of 1000 km) at a wavelength of 1.30 μm as wavelength for communication, and a transmission loss of 0.670 dB/km (average for fiber of 1000 km) at a wavelength of 1.38 μm as a wavelength for absorption by an OH group. On the other hand, optical fibers produced according to Examples 1 and 2 of the present invention appearing hereinbelow showed a transmission loss of 0.348 dB/km (average for fiber of 500 km) at the wavelength of 1.30 μm, and a transmission loss of 0.700 dB/km (average for fiber of 500 km) at the wavelength of 1.38 μm.

The cylindrical or cylindrical tubular glass material, which may preferably be used as the starting material in the present invention, may comprise any of glass materials having various refractive index arrangements (or refractive index structure) such as glass material for providing a core, and glass material comprising a portion for providing a core and a portion for providing a cladding. Particularly, a glass material having a structure for providing a core and a cladding may preferably be used, since the effect of the above-mentioned OH group poses substantially no problem in such a glass material.

The composition of the glass material to be used in the present invention may be any of those conventionally used for the starting material for an optical fiber glass preform of such a type.

In the present invention, it is preferred to clean the surface of the glass material as the starting material by conventional means before it is set or placed in the reaction vessel (i.e., before the preheating of the starting material in the present invention). Examples of such conventional means may include etching of the surface or surface layer with an aqueous HF solution, and heating of the glass material set in a glass lathe, in an oxyhydrogen flame.

Hereinbelow, the present invention will be described in further detail with reference to specific Examples. However, it should be understood that the present invention is by no means restricted by such specific Examples.

EXAMPLE 1

The starting material used in this Example was a glass rod (diameter=20 mm, length=600 mm) having a central (or core) portion comprising $SiO_2$ doped with 0.3% of $GeO_2$ in terms of relative refractive index difference, which had been produced by a VAD (vapor-phase axial deposition) method. The outer surface of the starting material was cleaned by heating at a temperature of from 1700° C. to 1800° C. using oxyhydrogen flame and a glass lathe. Then, the resultant starting material 1 was set in a reaction vessel (soot deposition muffle) 8 having a structure as shown in FIG. 1.

In the reaction vessel 8 shown in FIG. 1, a preheating burner 4 was disposed below a fine glass particle-synthesizing burner 2 (distance between the preheating burner and fine glass particle-synthesizing burner=10 cm). The preheating burner 4 had a structure as shown in FIG. 4, in which three-layered gas-supplying ports 12, 13 and 14 were concentrically arranged (inside diameter, central port 12=2 mm, second port 13=5 mm, third port 14=8 mm). $O_2$ gas was supplied to the central port 12 at 5 l(liter)/min., Ar as an inert gas was supplied to the second port 13 at 2 l/min. and hydrogen was supplied to the third port 14 at 12 l/min. The maximum temperature in a portion of the glass rod 1 preheated by flame was 1300° C. and the length of a region showing a temperature of 1100° C. or higher was 15 mm. $SiCl_4$ (2 l/min.), $O_2$ (45 l/min.), $H_2$ (30 l/min.) and Ar (20 l/min.) were supplied to the fine glass particle-synthesizing burner 2 so that fine glass particles were deposited on the starting material 1 immediately after the preheating thereof. During the soot deposition, the pull-up rate of the starting material 1 was 1.4 mm/min. on average and the preheating period of time was about 11 minutes.

As a result, there was produced a fine glass particle deposition product having a diameter of 160 mm and a length of 600 mm. The thus obtained deposition product was subjected to transparency-imparting vitrification by heating at 1650° C. in an He atmosphere thereby to provide an optical fiber preform having a diameter of 70 mm and a length of 450 mm. One end of the thus obtained preform was irradiated with a halogen lamp (i.e., the light emitting from the halogen lamp was incident to the above-mentioned one end of the preform), and defective points which scattered the light were observed. As a result, no formation of bubbles or crystals was observed.

In addition, ten preforms were produced and evaluated in the same manner as described above. The number of defects in the preforms thus obtained was as small as 0.005 defect/cm. Thus, preforms with very small number of defects were produced.

The resultant preform was subjected to fiber drawing to obtain an optical fiber having a diameter of 125 μm. The transmission loss of the thus obtained fiber was 0.348 dB/km (wavelength=1.30 μm) on average, and the fiber showed good characteristic.

EXAMPLE 2

The starting material used in this Example was a glass rod having a central portion comprising $SiO_2$ doped with 0.35% of $GeO_2$ in terms of relative refractive index difference, which had been produced by a VAD method. The outer surface of the starting material was cleaned by heating at a temperature of from 1700° C. to 1800° C. using oxyhydrogen flame and a glass lathe. Then, the resultant starting material 1 was set in a reaction vessel (soot deposition muffle) 8 having a structure as shown in FIG. 1.

In the reaction vessel 8 shown in FIG. 1, a preheating burner 4 was disposed below a fine glass particle-synthesizing burner 2. The preheating burner 4 had a structure as shown in FIG. 4, in which three-layered gas-supplying ports 12, 13 and 14 were concentrically arranged. $H_2$ gas was supplied to the central port 12 at 10 l(liter)/min., Ar as an inert gas was supplied to the second port 13 at 2 l/min. and $O_2$ was supplied to the third port 14 at 4 l/min. The maximum temperature in a portion of the glass rod 1 preheated by flame was 1150° C. and the length of a region showing a temperature of 1100° C. or higher was 10 mm.

$SiCl_4$ (2 l/min.), $O_2$ (45 l/min.), $H_2$ (30 l/min.) and Ar (20 l/min.) were supplied to the fine glass particle-synthesizing burner 2 so that fine glass particles were deposited on the starting material 1 immediately after the preheating thereof. During the soot deposition, the pull-up rate was 1.5 mm/min. on average and the preheating period of time was about 7 minutes.

As a result, there was produced a fine glass particle deposition product having a diameter of 160 mm and a length of 600 mm. The thus obtained deposition product was subjected to transparency-imparting vitrification by heating at 1650° C. in an He atmosphere thereby to provide an optical fiber preform having a diameter of 70 mm and a length of 450 mm. One end of the thus obtained preform was irradiated with a halogen lamp, and defective points which scattered the light were observed. As a result, few bubbles and crystals were observed in a number of 0.1 defect/cm.

In addition, ten preforms were produced and evaluated in the same manner as described above. The number of defects in the preforms thus obtained was as relatively small as 0.08 defect/cm. Thus, the level of number of defects was somewhat higher than that obtained in Example 1.

The resultant preform was subjected to fiber drawing to obtain an optical fiber having a diameter of 125 μm. The transmission loss of the thus obtained fiber was 0.351 dB/km (wavelength=1.30 μm) on average, and the fiber showed good characteristic.

EXAMPLE 3

The starting material used in this Example was a glass rod having a cladding portion comprising $SiO_2$ doped with 0.35% of F (fluorine) in terms of relative refractive index difference (decrease), which had been produced by a VAD method. The outer surface of the starting material was cleaned by heating at a temperature of from 1700° C. to 1800° C. using oxyhydrogen flame and a glass lathe. Then, the resultant starting material 1 was set in a reaction vessel (soot deposition muffle) 8 having a structure as shown in FIG. 1.

In the reaction vessel 8 shown in FIG. 1, a preheating burner 4 was disposed below a fine glass particle-synthesizing burner 2. The preheating burner 4 had a structure as shown in FIG. 4, in which three-layered gas-supplying ports 12, 13 and 14 were concentrically arranged. $O_2$ gas was supplied to the central port 12 at 4 l(liter)/min., Ar as an inert gas was supplied to the second port 13 at 2 l/min. and hydrogen was supplied to the third port 14 at 12 l/min. The maximum temperature in a portion of the glass rod 1 preheated by flame was 1250° C. and the length of a region showing a temperature of 1100° C. or higher was 12 mm. $SiCl_4$ (2 l/min.), $O_2$ (45 l/min.), $H_2$ (30 l/min.) and Ar (20 l/min.) were supplied to the fine glass particle-synthesizing burner 2 so that fine glass particles were deposited on the starting material 1 immediately after the preheating thereof. During the soot deposition, the pull-up rate was 1.4 mm/min. on average and the preheating period of time was about 9 minutes.

As a result, there was produced a fine glass particle deposition product having a diameter of 160 mm and a length of 600 mm. The thus obtained deposition product was subjected to fluorine doping and transparency-imparting vitrification by heating in an He atmosphere containing a fluorine compound thereby to provide an optical fiber preform comprising a core of pure silica glass and having a diameter of 70 mm and a length of 450 mm. One end of the thus obtained preform was irradiated with a halogen lamp, and defective points which scattered the light were observed. As a result, no formation of bubbles or crystals was observed.

In addition, ten preforms were produced and evaluated in the same manner as described above. The number of defects in the preforms thus obtained was as small as 0.01 defect/cm. Thus, preforms with very small number of defects were produced.

The resultant preform was subjected to fiber drawing to obtain an optical fiber having a diameter of 125 μm. The transmission loss of the thus obtained fiber was 0.335 dB/km (wavelength=1.30 μm) on average, and 0.172 dB/km (wavelength=1.55 μm) on average, and the fiber showed good characteristic.

EXAMPLE 4

The starting material used in this Example was a glass rod having a central (or core) portion comprising $SiO_2$ doped with 0.35% of $GeO_2$ in terms of relative refractive index difference, which had been produced by a VAD method. The outer surface of the starting material was cleaned by heating at a temperature of from 1700° C. to 1800° C. using oxyhydrogen flame and a glass lathe. Then, the resultant starting material 1 was set in a reaction vessel (soot deposition muffle) 8 having a structure as shown in FIG. 2.

In the reaction vessel 8 shown in FIG. 2, a preheating heater 10 comprising an electric resistance heating SiC heater (heater length=50 mm, inner diameter =30 mm) was disposed below a fine glass particle-synthesizing burner 2 (distance between the center of the preheating heater and fine glass particle-synthesizing burner=15 cm). When the maximum temperature of the heater 10 was 1250° C., the temperature of the surface of the glass rod 1 was elevated to 1150° C., and the length of a region showing a temperature of 1100° C. or higher was 25 mm.

$SiCl_4$ (2 l/min.), $O_2$ (45 l/min.), $H_2$ (30 l/min.) and Ar (20 l/min.) were supplied to the fine glass particle-synthesizing burner 2 so that fine glass particles were deposited on the starting material 1 immediately after the preheating thereof. During the soot deposition, the pull-up rate was 1.4 mm/min. on average and the preheating period of time was about 18 minutes.

As a result, there was produced a fine glass particle deposition product having a diameter of 160 mm and a length of 600 mm. The thus obtained deposition product was subjected to transparency-imparting vitrification by heating at 1650° C. in an He atmosphere thereby to provide an optical fiber preform having a diameter of 70 mm and a length of 450 mm. One end of the thus obtained preform was irradiated with a halogen lamp, and defective points which scattered the light were observed. As a result, no formation of bubbles or crystals was observed.

In addition, ten preforms were produced and evaluated in the same manner as described above. The number of defects in the preforms thus obtained was as small as 0.02 defect/cm. Thus, preforms with small number of defects were produced.

The resultant preform was subjected to fiber drawing to obtain an optical fiber having a diameter of 125 μm. The transmission loss of the thus obtained fiber was 0.351 dB/km (wavelength=1.30 μm) on average, and the fiber showed good characteristic.

EXAMPLE 5

The starting material used in this Example was a glass rod having a central (or core) portion comprising $SiO_2$ doped with 0.35% of $GeO_2$ in terms of relative refractive index difference, which had been produced by a VAD method. The outer surface of the starting material was cleaned by heating at a temperature of from 1700° C. to 1800° C. using oxyhydrogen flame and a glass lathe. Then, the resultant starting material 1 was set in a reaction vessel (soot deposition muffle) 8 having a structure as shown in FIG. 2.

In the reaction vessel 8 shown in FIG. 2, a preheating heater 10 comprising an electric resistance heating SiC heater (heater length=50 mm, inner diameter=30 mm) was disposed below a fine glass particle-synthesizing burner 2. When the maximum temperature of the heater 10 was 1000° C., the temperature of the surface of the glass rod 1 was elevated to 950° C.

$SiCl_4$ (2 l/min.), $O_2$ (45 l/min.), $H_2$ (30 l/min.) and Ar (20 l/min.) were supplied to the fine glass particle-synthesizing burner 2 so that fine glass particles were deposited on the starting material 1 immediately after the preheating thereof. During the soot deposition, the pull-up rate was 1.4 mm/min. on average.

As a result, there was produced a fine glass particle deposition product having a diameter of 160 mm and a length of 600 min. The thus obtained deposition product was subjected to transparency-imparting vitrification by heating at 1650° C. in an He atmosphere thereby to provide an optical fiber preform having a diameter of 70 mm and a length of 450 mm. One end of the thus obtained preform was irradiated with a halogen lamp, and defective points which scattered the light were observed. As a result, bubbles and crystals were observed at a density of 0.5 defect/cm.

Comparative Example 1

The starting material used in this Comparative Example was a glass rod having a central (or core) portion comprising $SiO_2$ doped with 0.35% of $GeO_2$ in terms of relative refractive index difference, which had been produced by a VAD method. The outer surface of the starting material was cleaned by heating at a temperature of from 1700° C. to 1800° C. using oxyhydrogen flame and a glass lathe. Then, the resultant starting material 1 was set in a reaction vessel (soot deposition muffle) 8 having a structure as shown in FIG. 3.

Figure 3:
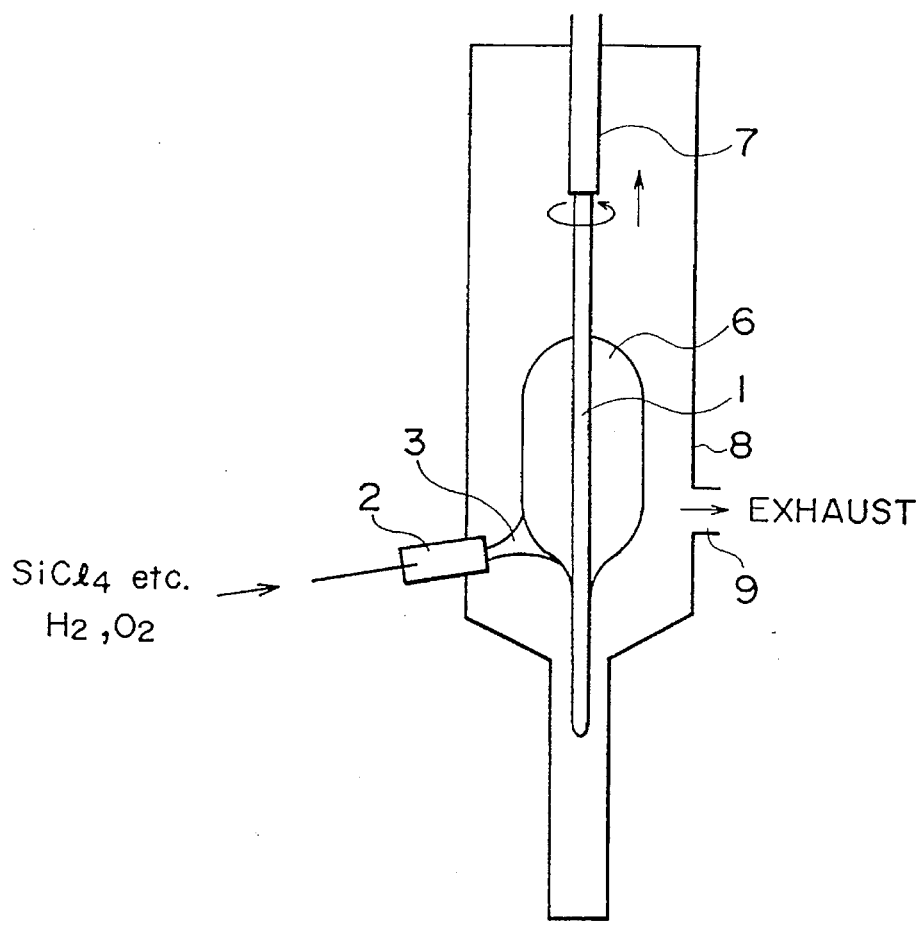
FIG. 3 is a schematic sectional view for illustrating an example of conventional apparatus for producing deposit of fine glass particles.

$SiCl_4$ (2 l/min.), $O_2$ (45 l/min.), $H_2$ (30 l/min.) and Ar (20 l/min.) were supplied to the fine glass particle-synthesizing burner 2 in FIG. 3 so that fine glass particles were deposited on the starting material 1 without preheating thereof. During the soot deposition, the pull-up rate was 1.4 mm/min. on average.

As a result, there was produced a fine glass particle deposition product having a diameter of 160 mm and a length of 600 mm. The thus obtained deposition product was subjected to transparency-imparting vitrification by heating at 1650° C. in an He atmosphere thereby to provide an optical fiber preform having a diameter of 70 mm and a length of 450 mm. One end of the thus obtained preform was irradiated with a halogen lamp, and defective points which scattered the light were observed. As a result, bubbles and crystals were observed at a density of 1.5 defect/cm.

Comparative Example 2

The starting material used in this Example was a glass rod having a central (or core) portion comprising $SiO_2$ doped with 0.3% of $GeO_2$ in terms of relative refractive index difference, which had been produced by a VAD method. The outer surface of the starting material was cleaned by heating at a temperature of from 1700° C. to 1800° C. using oxyhydrogen flame and a glass lathe. Then, the resultant starting material 1 was set in a reaction vessel (soot deposition muffle) 8 having a structure as shown in FIG. 1.

In the reaction vessel 8 shown in FIG. 1, a preheating burner 4 was disposed below a fine glass particle-synthesizing burner 2. The preheating burner 4 had a structure as shown in FIG. 4, in which three-layered gas-supplying ports 12, 13 and 14 were concentrically arranged. $O_2$ gas was supplied to the central port 12 at 7 l(liter)/min., Ar as an inert gas was supplied to the second port 13 at 2 l/min. and hydrogen was supplied to the third port 14 at 20 l/min. The maximum temperature in a portion of the glass rod 1 preheated by flame was 1620° C. and the length of a region showing a temperature of 1300° C. or higher was 15 mm.

$SiCl_4$ (2 l/min.), $O_2$ (45 l/min.), $H_2$ (30 l/min.) and Ar (20 l/min.) were supplied to the fine glass particle-synthesizing burner 2 so that fine glass particles were deposited on the starting material 1 immediately after the preheating thereof. During the soot deposition, the pull-up rate was 1.4 mm/min. on average.

The thus obtained deposition product was formed into a preform and the resultant preform was evaluated in the same manner as in Example 1. As a result, there was no defect and the preform showed good characteristic, but the glass rod portion of the preform showed an elongation of 2.5% as compared with the initial length, which was somewhat large in view of practical use thereof.

EXAMPLE 6

The starting material used in this Example was a glass rod having a central (or core) portion comprising $SiO_2$ doped with 0.35% of $GeO_2$ in terms of relative refractive index difference, which had been produced by a VAD method. The outer surface of the starting material was cleaned by heating at a temperature of from 1700° C. to 1800° C. using oxyhydrogen flame and a glass lathe. Then, the resultant starting material 1 was set in a reaction vessel (soot deposition muffle) 8 having a structure as shown in FIG. 1.

In the reaction vessel 8 shown in FIG. 1, a preheating burner 4 was disposed below a fine glass particle-synthesizing burner 2. The preheating burner 4 had a structure as shown in FIG. 4, in which three-layered gas-supplying ports 12, 13 and 14 were concentrically arranged. $O_2$ gas was supplied to the central port 12 at 6 l(liter)/min., Ar as an inert gas was supplied to the second port 13 at 2 l/min. and hydrogen was supplied to the third port 14 at 14 l/min. The maximum temperature in a portion of the glass rod 1 preheated by flame was 1400° C. and the length of a region showing a temperature of 1100° C. or higher was 20 min. $SiCl_4$ (2 l/min.), $O_2$ (45 l/min.), $H_2$ (30 l/min.) and Ar (20 l/min.) were supplied to the fine glass particle-synthesizing burner 2 so that fine glass particles were deposited on the starting material 1 immediately after the preheating thereof. During the soot deposition, the pull-up rate was 1.4 mm/min. on average and the preheating period of time was about 15 minutes.

As a result, there was produced a fine glass particle deposition product having a diameter of 160 mm and a length of 610 mm. The thus obtained deposition product was subjected to transparency-imparting vitrification by heating at 1650° C. in an He atmosphere thereby to provide an optical fiber preform having a diameter of 70 mm and a length of 450 mm. One end of the thus obtained preform was irradiated with a halogen lamp, and defective points which scattered the light were observed. As a result, no formation of bubbles or crystals was observed.

In addition, ten preforms were produced and evaluated in the same manner as described above. The number of defects in the preforms thus obtained was not larger than 0.002 defect/cm. Thus, preforms with very small number of defects were produced. In this Example, the preheating temperature was relatively high and the resultant preform showed an elongation of 0.2% on average in the glass rod portion.

The resultant preform was subjected to fiber drawing to obtain an optical fiber having a diameter of 125 μm. The transmission loss of the thus obtained fiber was 0.353 dB/km (wavelength=1.30 μm) on average, and the fiber showed relatively good characteristic.

As described hereinabove, according to the present invention, the surface of a starting glass material can be cleaned substantially perfectly in an apparatus for depositing glass fine particles (e.g., immediately before the deposition of the fine glass particles on the starting material), and the occurrence of a defect due to bubble and/or crystal possibly appearing at the boundary between the starting material and the deposit glass portion can be effectively prevented in the resultant glass product after transparency-imparting vitrification thereof. As a result, according to the present invention, a glass preform for optical fiber substantially free from a defect can be produced with a good yield.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A process for producing a porous glass preform for an optical fiber comprising:

preheating a glass surface portion of a member at a maximum preheating temperature of not lower than 1100° C. and lower than 1600° C. for a period of time of not less than 5 minutes to clean the glass surface portion; and depositing fine glass particles on the glass surface portion of the member cleaned by said preheating.

2. A process according to claim 1, wherein said depositing of the fine glass particles is conducted while continuously moving the member relative to the fine glass particles.

3. A process according to claim 1, wherein said preheating of the glass surface portion of the member is conducted immediately before said depositing of the fine glass particles on the glass surface portion.

4. A process according to claim 1, wherein the maximum preheating temperature is not lower than 1200° C. and lower than 1400° C.

5. A process according to claim 1, wherein the maximum preheating temperature is a temperature at which the glass surface portion has a viscosity of $5 \times 10^8$ poise or higher.

6. A process according to claim 1, wherein the maximum preheating temperature is not lower than 1200° C.

7. A process according to claim 1, wherein the glass surface portion is subjected to said preheating in a preheating atmosphere containing water vapor.

8. A process according to claim 7, wherein the preheating atmosphere contains water vapor in an amount of 1% by volume or larger.

9. A process according to claim 1, further comprising:

providing a burner for discharging an oxyhydrogen flame for said preheating of the glass is surface portion.

10. A process according to claim 9, further comprising supplying a gas having an $H_2/O_2$ ratio of at least 2.0 to the burner.

11. A process according to claim 1, further comprising providing a burner comprising a plurality of gas ports concentrically arranged for said preheating of the glass surface portion, and supplying oxygen to a central port of the burner.

12. A process according to claim 1, further comprising:

providing a burner comprising a first port for receiving oxygen, a second port for receiving hydrogen, and a third port for receiving an inert gas; and supplying oxygen, hydrogen, and an inert gas to the first, second, and third ports, respectively.

13. A process according to claim 1, wherein said preheating is conducted with an electric resistance heater which is disposed upstream of a burner.

14. A process according to claim 13, further comprising supplying a gas containing water vapor to the glass surface portion during said preheating.

15. A process according to claim 1, wherein the member provides a base for preparing a core for the glass preform, a cladding for the glass preform, or a core and cladding for the glass preform.

16. A process according to claim 1, wherein said depositing step is conducted while continuously moving the member along a longitudinal axis thereof relative to the fine glass particles so that the fine glass particles are deposited on the glass surface portion in a direction of said relative movement.

* * * * *